US007539221B1

(12) United States Patent
Jiang et al.

(10) Patent No.: US 7,539,221 B1
(45) Date of Patent: *May 26, 2009

(54) FIBER-LASER-BASED GIGAHERTZ SOURCES THROUGH DIFFERENCE FREQUENCY GENERATION (DFG) BY NONLINEAR OPTICAL (NLO) MATERIALS

(75) Inventors: Shibin Jiang, Tucson, AZ (US); Wei Shi, Tucson, AZ (US); Matthew Leigh, Tucson, AZ (US); Jie Zong, Tucson, AZ (US)

(73) Assignee: NP Photonics, inc, Tucson, AZ (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/583,628

(22) Filed: Oct. 19, 2006

(51) Int. Cl.
*H01S 3/115* (2006.01)
(52) U.S. Cl. .......................................... 372/12; 372/17
(58) Field of Classification Search ................. 372/40, 372/21, 22, 6, 12; 250/338.1
See application file for complete search history.

(56) References Cited

U.S. PATENT DOCUMENTS

| | | | | |
|---|---|---|---|---|
| 5,991,316 | A * | 11/1999 | Kikuchi | 372/21 |
| 6,144,679 | A * | 11/2000 | Herman et al. | 372/21 |
| 6,738,397 | B2 * | 5/2004 | Yamamoto et al. | 372/21 |
| 6,940,877 | B2 * | 9/2005 | Hu et al. | 372/6 |
| 7,054,339 | B1 * | 5/2006 | Hu et al. | 372/12 |
| 7,391,795 | B2 * | 6/2008 | Yumoto et al. | 372/22 |

OTHER PUBLICATIONS

A.W. Fliflet, et al, Cloud Imaging Using the NRL Warloc Radar, Naval Researach Laboratory, Washington, DC.
James B. Mead, et al, Millimeter-Wave Radars for Remotely Sensing Clouds and Precipitation, 1994 IEEE.
Donald E. Wortman, et al, Generation of Millimeter-wave Radiation by means of a Smith-Purcell Free-electron Laser, Physical Review A, vol. 24, No. 2, Aug. 1981.
G.L. Carr, et al, High-Power Terahertz Radiation From Relativistic Electrons, Letters to Nature, vol. 420, Nov. 14, 2002.
Patrick G. O'Shea, Henry P. Freund, Free-Electron Lasers: Status and Applications, Science's Compass Review, vol. 292, Jun. 8, 2001.
B.B. Hu, M.C. Nuss, Imaging With Terahertz Waves, Optics Letters, vol. 20, No. 16, Aug. 15, 1995.
Cecilie Renne, et al, THz Spectroscopy of Liquid H2O and D2O, Physical Review Letters, vol. 82, No. 14, Apr. 5, 1999.
Michael Schall, Peter Uhd Jepsen, Photoexcited GaAs Surfaces Studied by Transient Terahertz Time-domain Spectroscopy, Optics Letters, vol. 25, No. 1, Jan. 1, 2000.
Tae-In Jeon, D. Grischkowsky, Electrical Characterization of Conducting Polypyrrole by THz Time-domain Spectroscopy, Applied Physics Letters, vol. 77, No. 16, Oct. 16, 2000.

(Continued)

*Primary Examiner*—Minsun Harvey
*Assistant Examiner*—Tuan N. Nguyen
(74) *Attorney, Agent, or Firm*—Eric A. Gifford

(57) ABSTRACT

A fiber-laser-based implementation of a Gigahertz source through difference frequency generation (DFG) by nonlinear optical (NLO) materials is compact, tunable and scalable. A pair of pulsed fiber lasers, preferably single-frequency, generate output pulses at frequencies $\omega 1$ and $\omega 2$ that overlap temporally. A beam combiner combines the laser outputs and routes the combined output to a GHz generator head where a nonlinear interaction process in the NLO material generates GHz radiation.

8 Claims, 6 Drawing Sheets

OTHER PUBLICATIONS

Eric R. Mueller, et al, 2.5 THZ Laser Local Oscillator For The EOS Chem 1 Satellite, Proceedings of the Ninth International Symposium on Space Terahertz Technology, p. 563 (1998).

E.R. Brown, F.W. Smith, K.A. Mcintosh, Coherent Millimeter-wave Generation by Heterodyne Conversion in Low-temperature-grown GaAs Photoconductors, 1993 American Institute of Physics, J. Appl. Phys. 73 (3), Feb. 1, 1993.

S. Verghese, et al, Highly Tunable Fiber-Coupled Photomixers with Coherent Terahertz Outpur Power, IEEE Transactions on Microwave Theory and Techniques, vol. 45, No. 8, Aug. 1997.

P.G. Huggard, et al, Efficient Generation of Guided Millimeter-Wave Power by Photomixing, IEEE Photonics Technology Letters, vol. 14, No. 2, Feb. 2, 2002.

H. Ito, et al, Photonic Terahertz-wave Generation Using Antenna-integrated Uni-travelling-carrier Photodiode, Electronics Letters, vol. 39, No. 25, Dec. 11, 2003.

Masahiko Tani, et al, Generation of Terahertz Radiation by Photomixing with Dual- and Multi-le-mode Lasers, Institute of Physics Publishing, Semicond. Sci. Technol. 20 (2005) S151-S163, Published in the UK.

B. Sartorius, et al, 12-64 GHz Continuous Frequency Tuning in Self-Pulsating 1.55-um Multiquantum-Well DFB Lasers, IEEE Journal of Selected Topics in Quantum Electronics, vol. 1, No. 2, Jun. 1995.

Lawrence Ives, et al, Development of Efficient Backward Wave Oscillators for Submillimeter Applications, P2.27, Saratoga, CA.

Thomas W. Crowe, et al, GaAs Devices and Circuits for Terahertz Applications, 1000 IEEE MTT-S Digest, WE1D-3, P. 929-932.

Wei Shi, et al, Efficient, Tunable and Coherent 0.18-5.27-THz Source Based on GaSe Crystal, Optics Letters, vol. 27, No. 16, Aug. 15, 2002.

Wei Shi, et al, A Monochromatic and High-Power Terahertz Source Tunable in the Ranges of 2.7-38.4 and 58.2-3540 um for Variety of Potential Applications, Applied Physics Letters, vol. 84, No. 10, Mar. 8, 2004.

M. Alles, et al, Distributed Velocity-Matched 1.55 um InP Travelling-Wave Photodetector for Generation of High MillimeterWave Signal Power, 1998 IEEE MTT-S Digest, TH1C-4, p. 1233-1235.

Xinhong Wang, et al, Optical Generation of Microwave/Millimeter-Wave Signals Using Two-Section Gain-Coupled DFB Lasers, IEEE Photonics Technology Letters, vol. 11, No. 10, Oct. 1999.

\* cited by examiner

FIBER-LASER-BASED GIGAHERTZ SOURCES THROUGH DIFFERENCE FREQUENCY GENERATION (DFG) BY NONLINEAR OPTICAL (NLO) MATERIALS

GOVERNMENTAL RIGHTS

This invention was made with Government support under Contract N66001-06-C-6003 awarded by The Space and Naval Warfare Systems Center San Diego (SPAWARSY-SCEN SD). The Government has certain rights in this invention.

BACKGROUND OF THE INVENTION

1. Field of the Invention

This invention relates to Gigahertz sources and more specifically to a fiber-laser-based Gigahertz source through difference frequency generation (DFG) by nonlinear optical (NLO) materials.

2. Description of the Related Art

A GHz source covers the region of the electromagnetic spectrum from approximately tens of GHz to several hundred GHz or alternately approximately 1 millimeter to 10 millimeters. A GHz source is also referred to as a millimeter wave source. The GHz source has a number of applications from industrial to military applications. In radar and imaging applications their shorter wavelength compared to microwaves offers higher resolution and greater bandwidth. The high frequency makes mm-waves attractive for communications systems, and frequencies on the order of 30 GHz are used for both terrestial and satellite communications. For additional background on GHz source application see: (1) Infrared and Millimeter Waves: Coherent Sources and Applications, Part II, Edited by Kenneth J. Button, Academic Pr (January 1983), (2) M. V. Kartikeyan, E. Borie, and M. K. A. Thumm, Gyrotrons, High Power Microwave and Millimeter Wave Technology. Berlin: Springer-Verlag, 2004, pp. 185-192, (3) A. W. Fliflet, et. al., "Cloud imaging using the NRL WAR-LOC radar," Conference Record of the RF 2003 Workshop, pp 329-338, 2003, and (4) J. B. Mead, et. al., "Millimeter-wave radars for remotely sensing clouds and precipitation," Proc. IEEE, vol. 82, pp. 1891-1906, December 1994.

Among the technologies that have been used to generate GHz sources, free-electron lasers can produce extremely-powerful and widely-tunable GHz radiation (D. E. Wortman et al., *Phys. Rev. A* (1981); G. L. Carr, *Nature*, (2002); P. G. O'Shea, *Science*, (2001)). Subpicosecond GHz (or THz) pulses with a broad bandwidth can be generated by ultrafast laser pulses based on photoconduction and optical rectification (B. B. Hu et al., *Opt. Lett.* (1995); C. Rønne et al., *Phys. Rev. Lett.* (1999); M. Schall et al., *Opt. Lett.* (2000); T. I. Jeon et al., *Appl. Phys. Lett.* (2000)). Optically pumped GHz lasers can be generated by using long-wavelength IR lasers such as $CO_2$ laser to pump a low-pressure molecular gas such as methanol (E. R. Mueller et al, *Proceedings of the Ninth International Symposium on Space Terahertz Technology*, (1998)).

GHz waves can be generated by using a photomixer. Two types of photomixers have been mainly used to generate GHz radiation: one is low-temperature-grown GaAs (LTG) (E. R. Brown et al, *J. Appl. Phys.* (1993) and S. Verghese et al, *IEEE Trans. Microwave Theory Tech.* (1997)); another one is uni-travelling-carrier photodiode (M. Alles et al., *IEEE MT-S Digest*, (1998); P. G. Huggard et al., *IEEE Photonics Technology Letters*, (2002); H. Ito et al., *Electronics Letters*, (2003); M. Tani et al., *Semiconductor Science and Technology*, (2005)).

GHz generation has been reported by using self pulsation in two-section distributed-feedback (DFB) lasers (B. Sartorius et al., *IEEE J. Select. Topics Quantum Electron.* (1995); X. Wang et al., *IEEE Photonics Technology Letters*, (1999)). The commercial Backward wave oscillator (BWO) is the conventional GHz (microwave or millimeter) wave source; L. Ives et al, *Vacuum Electronics Conference*, (2000)). Direct multiplier-based GHz source is another commercial GHz source; T. W. Crowe et al, *IEEE MTT Micro. Symp. Dig.*, (1999)).

Among all the novel techniques for GHz generation, optical parametric processes such as difference-frequency generation (DFG) in nonlinear optical (NLO) crystals are quite promising (W. Shi et al, *Opt. Lett.* (2002); S. Yamamoto et al., U.S. Pat. No. 6,738,397). For example, recently GaSe crystal was used to generate coherent GHz waves tunable from 84 GHz to 5 THz pumped by using a Nd:YAG laser beam and the idler beam of an optical parametric oscillator (OPO) pumped by the third harmonic of the same Nd:YAG laser (W. Shi et al., *Appl. Phys. Lett.*, (2004)). The GHz sources generated by DFG are coherent, powerful and widely tunable. But the size, weight and integration of the reported 'free-space' implementations are an impediment to commercial success.

Overall, Each of the approaches mentioned above has one or more of the following disadvantageous features: (1) bulky in size and not portable, (2) requires cryogenic or water cooling, (3) low output power, thus difficult to scale to high power, (4) spatial incoherent beam, thus cannot have diffraction-limited output, and (5) no spectral agility.

To meet the growing demand for GHz sources, a new technology or innovative implementation of an existing technology is needed that provides for a compact, lightweight, tunable, high power GHz source that doesn't require cryogenic cooling. This source would preferably be capable of generating a diffraction-limited output beam as well.

SUMMARY OF THE INVENTION

The present invention provides an integrated DFG GHz source that is capable of scaling in both output power level and number of output channels. The source is also tunable over a wide range, capable of generating a diffraction-limited output and does not require cryogenic cooling.

This is accomplished with a fiber-laser-based implementation of a Gigahertz source through difference frequency generation (DFG) by nonlinear optical (NLO) materials. A pair of pulsed fiber lasers generates single-frequency pulsed outputs at frequencies ω1 and ω2 that overlap temporally. A beam combiner combines the laser outputs and routes the combined output to a GHz generator head where a nonlinear interaction process in the NLO material generates GHz radiation that is output from the head. Fiber amplifiers can be used to increase the power of the Q-switched laser before beam combiner. If needed, fiber amplifiers or free space amplifiers can also be used between the beam combiner and generator head to amplify the combined signal so that the total GHz output power will be correspondingly boosted. The insertion of a 1×N fiber splitter in the optical path scales the GHz source to N channels. This "all-fiber" solution from the pump lasers to the generator head produces a very compact, lightweight and cost effective GHz source.

These and other features and advantages of the invention will be apparent to those skilled in the art from the following

DETAILED DESCRIPTION OF THE INVENTION

The present invention provides an integrated DFG GHz source that is capable of scaling in both output power level and number of output channels. The compact and lightweight GHz source covers a wide range from 30 to 300 GHz (1,000 to 10,000 microns), capable of generating a diffraction-limited output and does not require cryogenic cooling.

Figure 1:
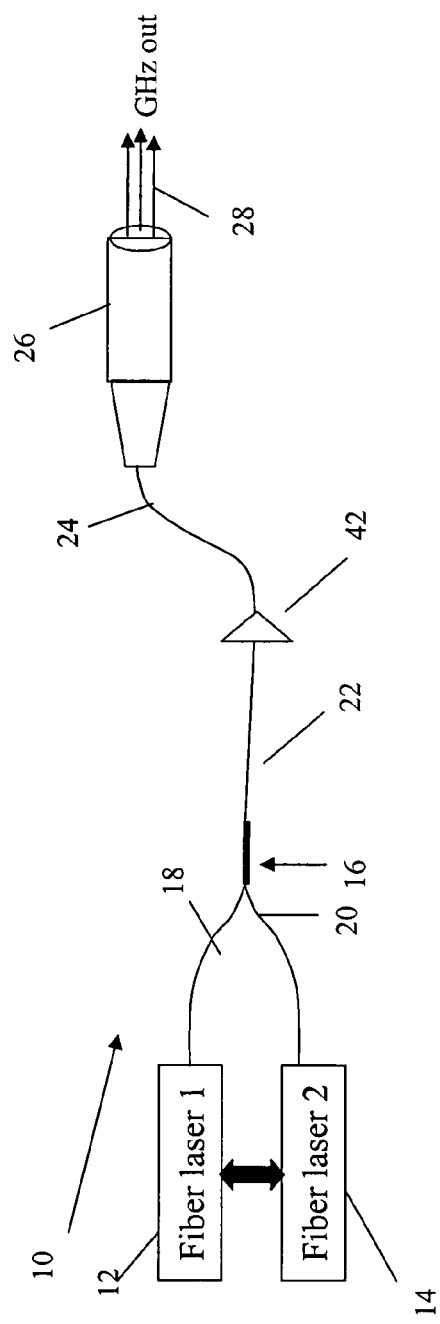
FIG. 1 is a diagram of a fiber-laser-based Gigahertz source.

This is accomplished with a fiber-laser-based implementation of a Gigahertz source 10 through difference frequency generation (DFG) by nonlinear optical (NLO) materials, e.g. crystals such as GaAs, GaSe, $ZnGeP_2$, GaP, $LiNbO_3$, or polymers such as DAST and poled polymers as shown in FIG. 1. A pair of pulsed fiber lasers 12 and 14, suitably Q-switched, generate single-frequency outputs at frequencies $\omega 1$ and $\omega 2$. The fiber lasers preferably generate single-frequency (single-transverse and single-longitudinal mode) outputs to ensure wavelength stability. A fiber beam combiner 16 includes a pair of input fibers 18 and 20 that are spliced to the fiber lasers and an output fiber 22 that is spliced to a fiber pigtail 24 of a GHz generator head 26. Alternately, a free-space beam combiner could be used. The fiber beam combiner combines the laser outputs and routes the combined output to the GHz generator head 26 where a nonlinear interaction process in the NLO material generates GHz radiation 28 that is output from the head. This "all-fiber" solution from the pump lasers to the generator head produces a very compact, lightweight and cost effective GHz source. If needed, a fiber amplifier can spliced between the beam combiner 16 and generator head 26 to amplify the combined signal. The insertion of a 1×N fiber splitter in the optical path after beam combiner 16 scales the GHz source to N channels.

Figure 2:
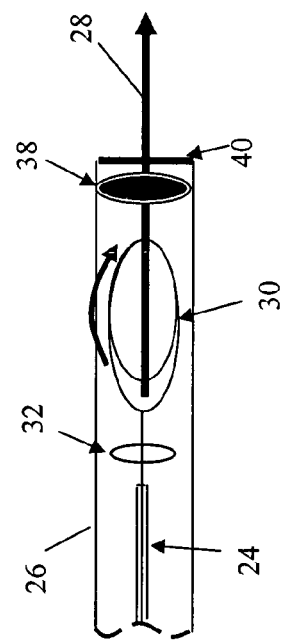
FIG. 2 is a diagram of a typical generator head.
Figure 3:
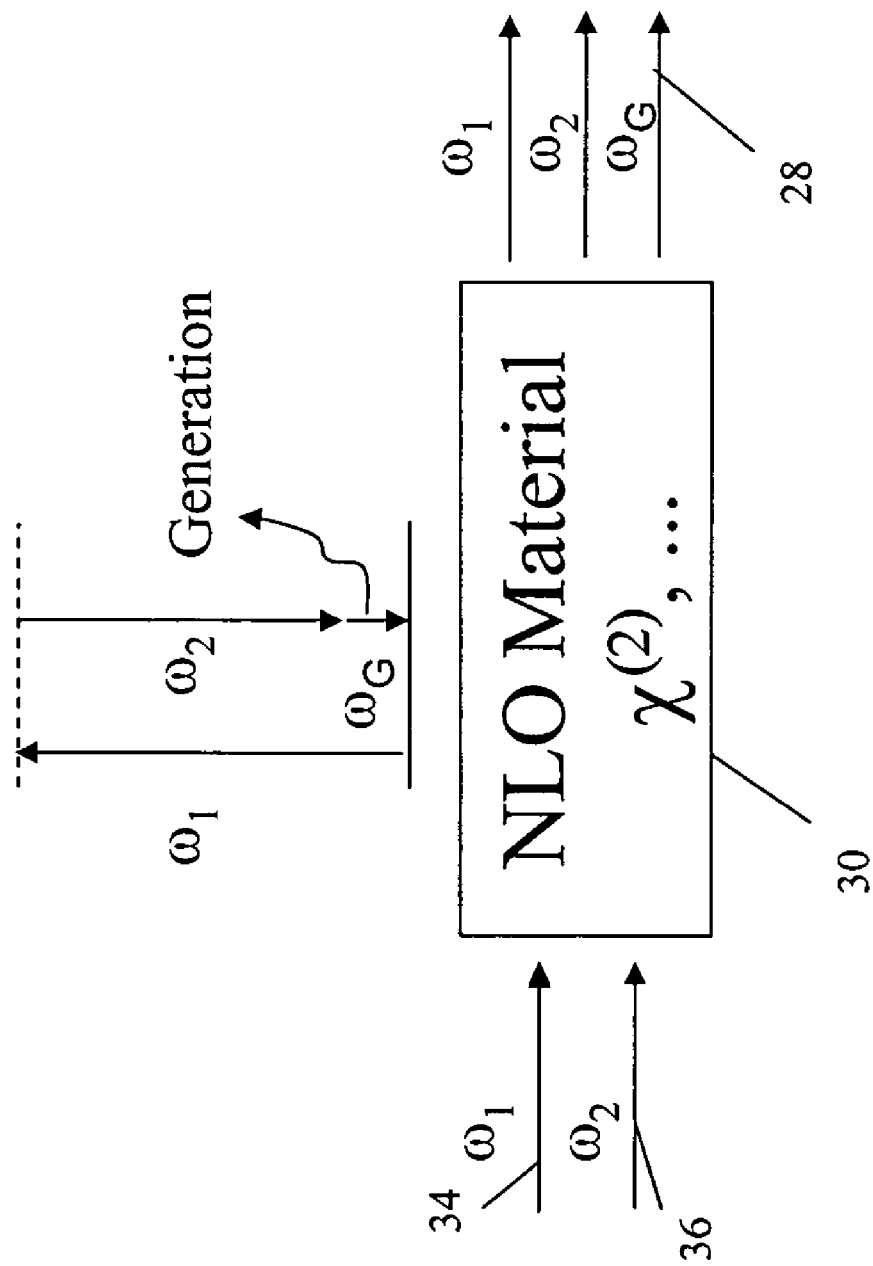
FIG. 3 is a diagram of difference-frequency generation (DFG) using a nonlinear optical (NLO) crystal.

As shown in FIG. 2, inside the GHz generator head 26, the combined laser output is coupled from fiber pigtail 24 to a nonlinear optical (NLO) material 30 through a fiber collimator 32. As illustrated in FIG. 3, the difference frequency generation is a second-order nonlinear process through second-order susceptibility of the NLO material 30. The two input beams 34 and 36 with frequencies $\omega 1$ and $\omega 2$ ($\omega 1 > \omega 2$ with the difference within the Gigahertz region) may have different or same polarization orientations relative to the optical axis of the NLO material so that they have same optical propagation indices to achieve phase matching. Quasi-phase matching can also be implemented by periodically-poled crystal such as PPLN. During the process, each $\omega 1$ being annihilated will be accompanied by one $\omega 2$ and one $\omega_G = \omega 1 - \omega 2$ being generated coherently. The GHz radiation 28 at frequency $\omega_G$ is passed through another collimator 38 and an output window 40 to filter out residual w1 and w2.

As shown in FIG. 1, the GHz source 10 is well suited to scale in power to meet future power requirements. If needed, a fiber amplifier 42 is spliced between the beam combiner 16 and generator head 26 to amplify the combined signal. As a result, the total GHz output power will be correspondingly boosted.

Figure 4:
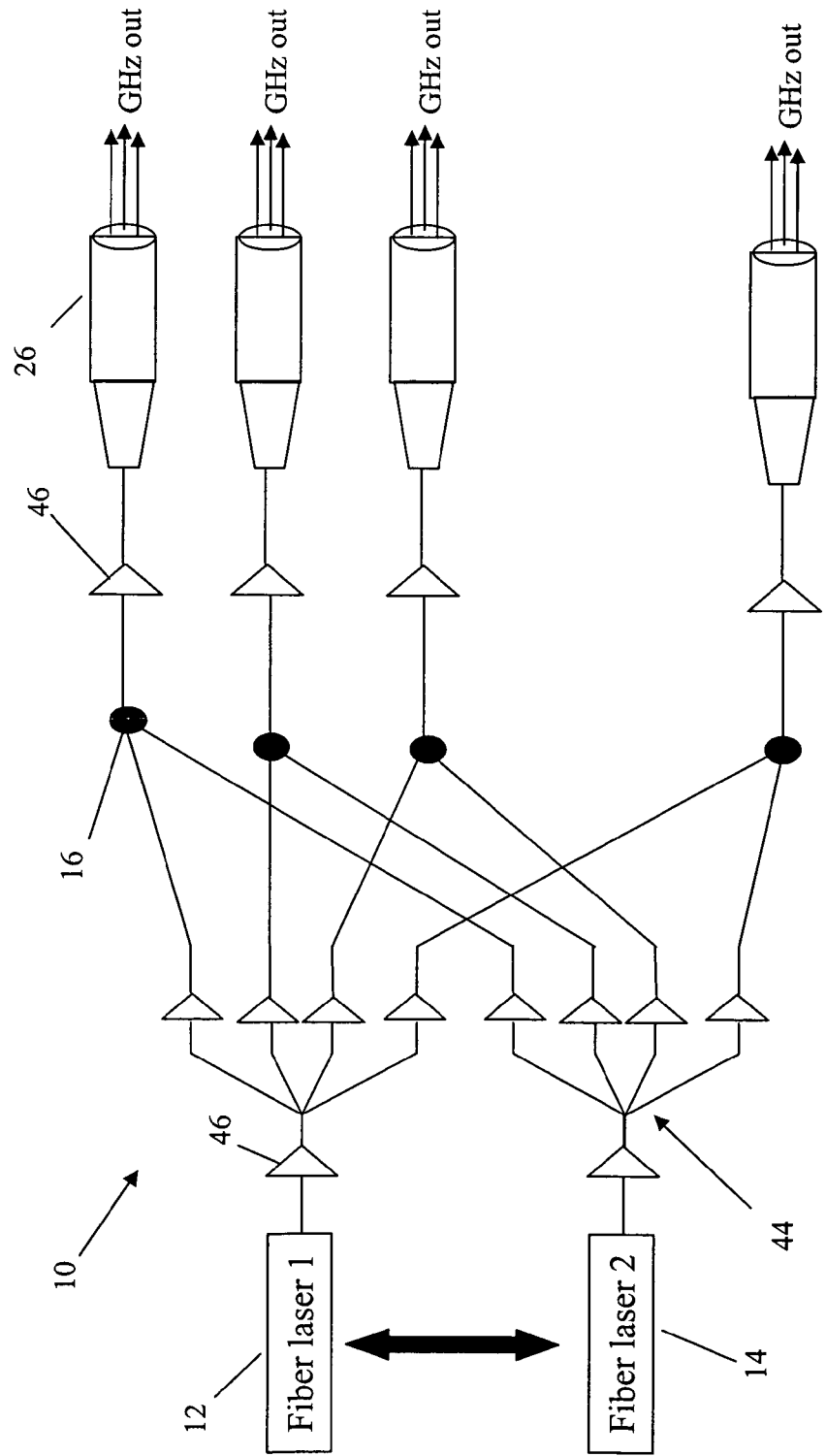
FIG. 4 is a block diagram of a Gigahertz source array.

As shown in FIG. 4, the GHz source 10 is well suited to be scaled to a GHz source array. The insertion of a 1×N fiber splitter 44 in the optical path between the fiber lasers 12, 14 and beam combiners 16 scales the GHz source to N channels. A fiber amplifier 46 is spliced between the beam combiner and the GHz generator head 26 in each channel to amplify the combined signal. An additional fiber amplifier 46 may also be positioned just after the fiber laser in front of the fiber splitter 44

Figure 5:
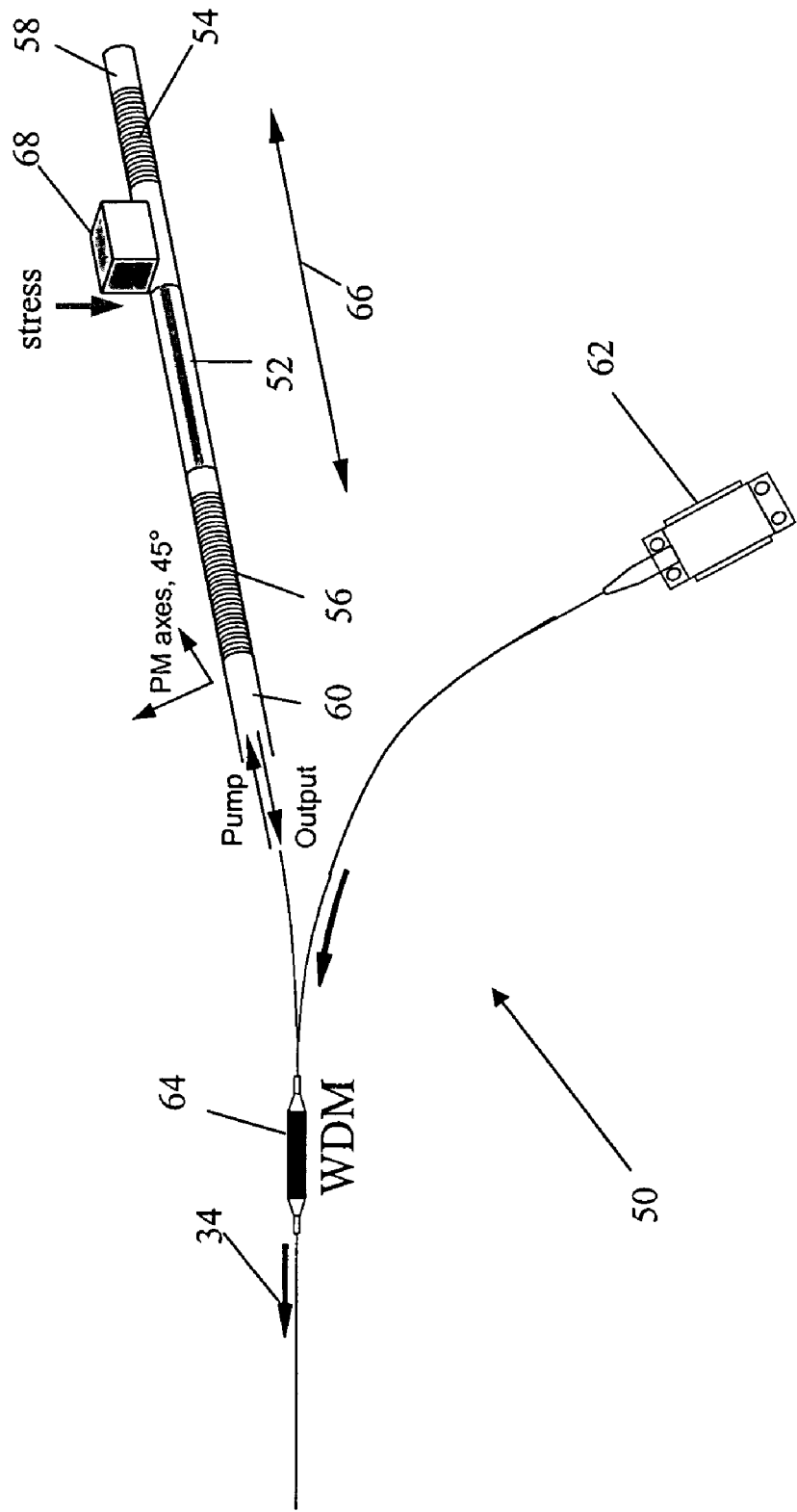
FIG. 5 is a diagram of a single-frequency Q-switched fiber laser.

Using a Q-switched fiber laser of the type shown in FIG. 5 for fiber lasers 12 and 14 effectively increases the peak power of the GHz radiation. A full presentation of the Q-switched fiber laser is given in copending U.S. patent application Ser. No. 10/665,032 entitled "All-Fiber Q-switched Laser", filed on Sep. 16, 2003, which is hereby incorporated by reference.

A typical 1.55 micron (or other C-band wavelength) Q-switched laser 50 consists of an Er/Yb-codoped phosphate glass fiber 52 that is less than 10 cm and suitably 2-5 cm in length spliced between a pair of silica-based fiber Bragg gratings (FBGs) 54 and 56 (FIG. 5). Owing to the high solubility, the phosphate glass allows high doping concentration of active ions, enabling an efficient laser with active fibers only a few centimeters long. One FBG 54 has high reflectivity (HR) and is imprinted on a standard silica fiber 58. The other FBG 56 or output coupler with R ranging from 10% to 80% is formed on a polarization-maintaining (PM) fiber 60, splitting the reflection wavelength for different polarizations, each having approximately 10 GHz of bandwidth. The laser is suitably pumped by a fiber-pigtailed, single-mode, 976-nm diode 62 for telecommunication applications. The pump light is coupled to the laser cavity through the output coupler 56, which is spliced to a WDM coupler 64 to separate the pump from the laser output 34.

The reflection band of the high reflector 54 is matched to only one of the reflection bands of the output coupler 56, making the laser cavity 66 polarization dependent. The HR-FBG 54 on standard fiber 58 is cleaved and spliced at a few millimeters away from the FBG, leaving room to be stressed to produce birefringence. The longitudinal mode spacing is 2.5-3 GHz, therefore there are only a few longitudinal modes supported in the reflection band of the output coupling FBG 56. Single-frequency operation can be maintained by proper adjustment of the temperature of the FBGs as well as the entire cavity.

Spectral tuning of the laser cavity can be realized by adjusting the temperatures of the FBGs as well as the whole laser cavity or by stretching the whole laser cavity through a PZT actuator. To modulate the loss internal to the resonator, a PZT actuator 68 was clamped on fiber 58 to apply stress from the side of the fiber in the section between the splice and the high-reflection FBG, introducing the birefringence in the fiber. Because of the polarization dependence of the resonator, the loss of the resonator can be modulated. To maintain high contrast in the loss-modulation, the orientation of the stress was keyed at 45 degrees with respect to the slow/fast axes of the PM fiber 60. To improve the temporal overlap between the pulses from the pair of Q-switched lasers, a single PZT actuator 68 can be configured to apply stress to both fiber lasers.

Figure 6:
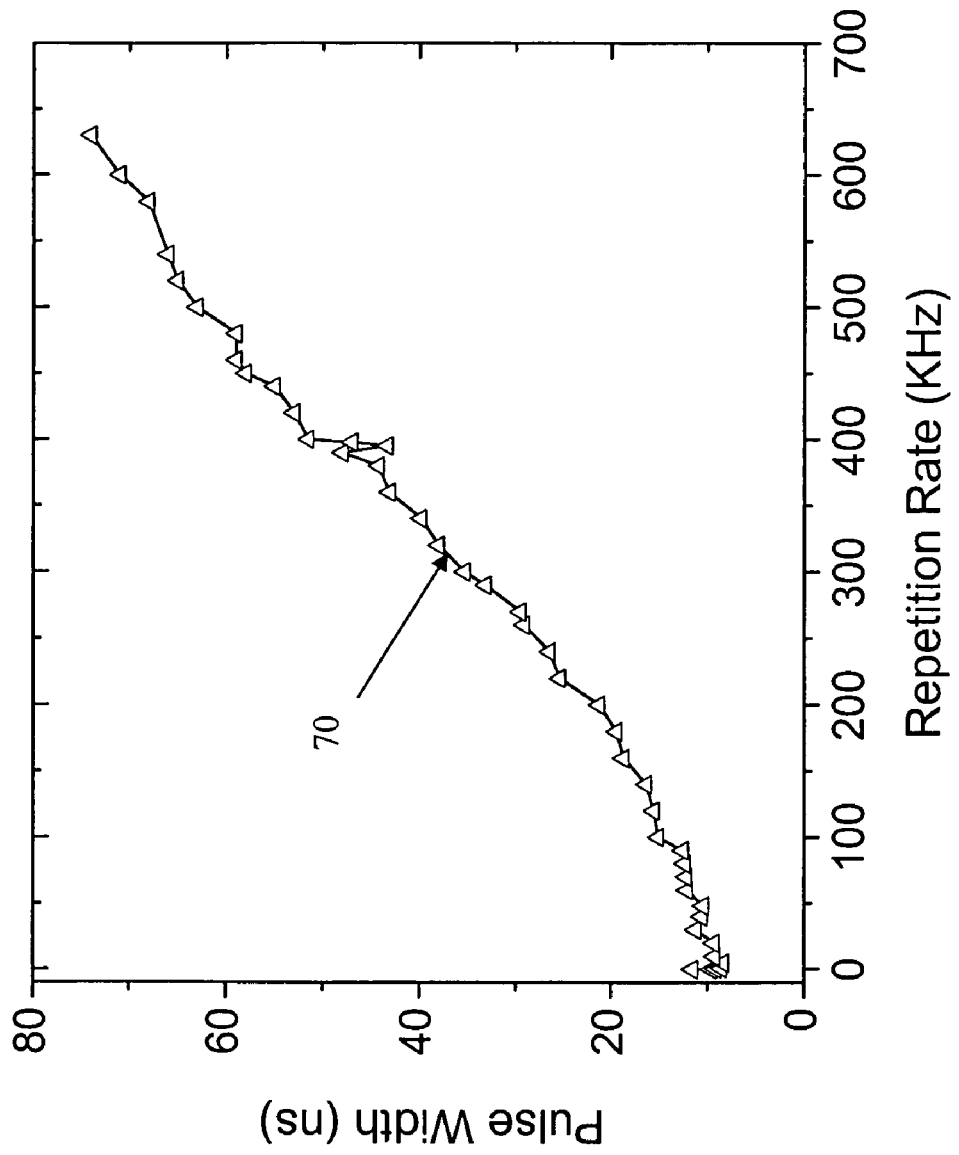
FIG. 6 is a plot of typical pulse widths versus repetition rate of the Q-switched laser.
Figure 7:
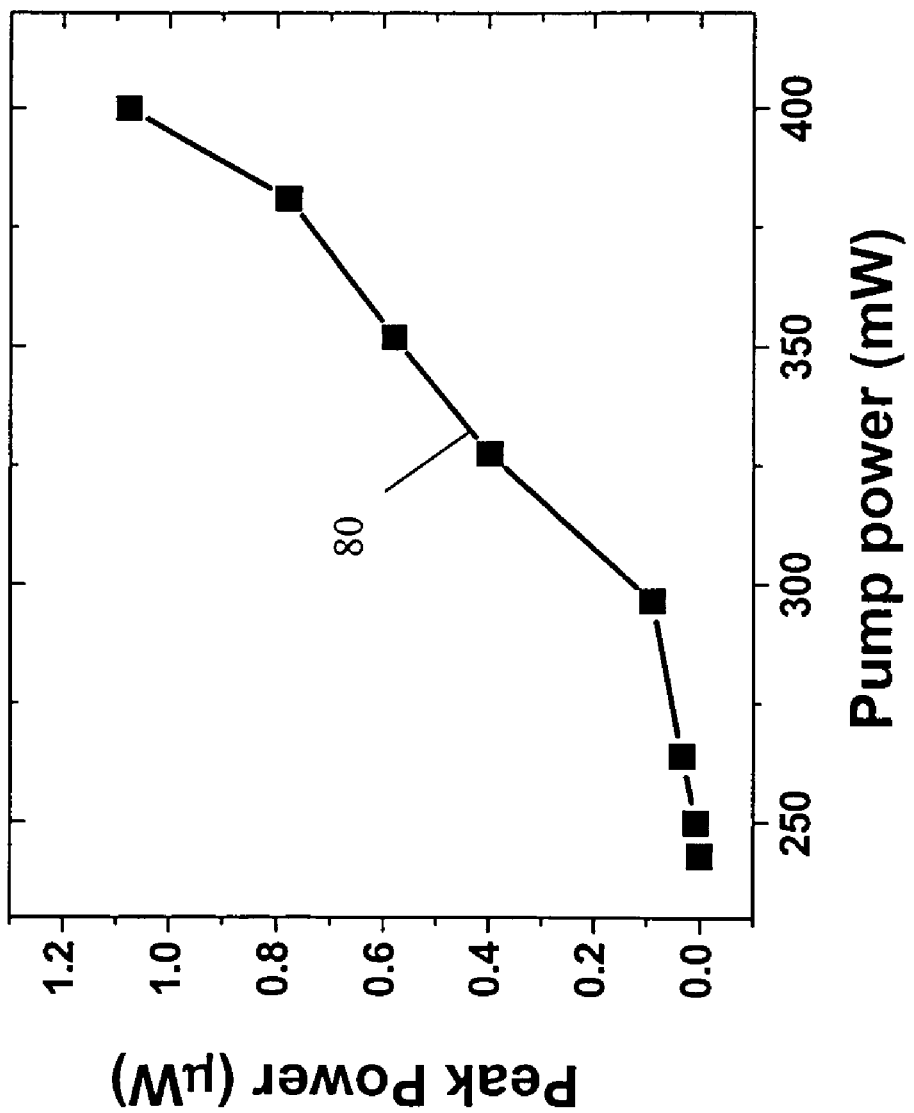
FIG. 7 is a plot of peak output power versus pump power for a Gigahertz source generated by Q-switched fiber lasers.

Typical pulse shapes for the all-fiber Q-switched laser 50 are show in FIG. 6. A pulse width 70 of 8 ns to 70 ns full-width half-maximum (FWHM) and a repetition rate from 50 Hz to 650 kHz has been demonstrated. The power density of pulse 70 is close to 100 MW/cm². The pulse energy can be increased significantly when the laser is operated at a lower repetition rate. The peak power density can be readily increased to close to 5 GW/cm², which is the physical break down power density of silica fibers. The Gigahertz source was generated by pumping a piece of GaSe nonlinear crystal with a pair of Q-switch fiber lasers at 1550.10 nm and 1552.27 nm. The corresponding frequency is 270 GHz. FIG. 7 is a plot of peak power 80 versus pump power for a 270 GHz (1110 µm) laser. The repetition rate is 40 KHz and pulse width is approximately 20 ns.

The fiber-laser-based implementation of a Gigahertz source through difference frequency generation (DFG) by nonlinear optical (NLO) crystals using high power Q-switched 1.55-micron or 1-micron fiber lasers provides a number of benefits.

Narrow Linewidth, Single-Frequency: The Q-switched fiber laser operates in a robust single-transverse, single-longitudinal mode ("single-frequency") with a narrow linewidth. An innovative active Q-switch mechanism is added from outside to part of the fiber cavity. Such narrow linewidth/long coherence length is not available by any other GHz generation approaches. This feature will provide revolutionary technology benefits for coherent detection.

Diffraction limited beam: Collinear phase matching is used to generate GHz radiation, i.e. the input and output beams propagate in the same direction and the relative phases between the beams does not change significantly through propagation. Since only nonlinear processes are involved, the generated GHz source beam will easily retain the diffraction-limited beam nature of the fiber lasers. Single-mode fiber lasers have shown the highest beam quality or smallest beam divergence in known lasers. Such diffraction-limited beam can be manipulated by subsequent optics to achieve long standoff range with ultimate high spatial resolution.

Compactness: The laser cavity length of the Q-switched fiber lasers is <10 cm and suitably 2-5 cm. As described in the copending application, the whole laser cavity can be placed in a miniature vibration-and-acoustic isolated enclosure with built-in temperature and electronic control interface. With the addition of about 10-mm long nonlinear optical crystals and auxiliary optics for focusing, collimating and filtering, the whole system will be very small and easy for integration since most components are fiber-based.

Scalability: The scalability of the fiber-laser-based GHz sources is manifest in two aspects. One is that it is scalable in output power. The output power of the fiber lasers can be readily increased by commercially available rare-earth-doped fiber amplifiers. The output power of generated GHz sources is only limited by the physical break down threshold of silica fibers and nonlinear optical crystals. The power density and average power of the fiber laser can be 5 GW/cm² and 100 W respectively with current fiber amplifier technology. GHz sources with peak power of a few kilo Watts and average power more than 100 mW can be achieved with required pump laser power density still less than material physical break down.

Furthermore, the GHz source can be scaled to GHz source array. With most components of the GHz source being fiber-based, its compactness and flexible fiber management can be fully exploited to form an array of GHz sources in either one or two dimensions. To make an array of GHz sources even more compact and integrated, a combined output of two Q-switched fiber lasers can be split into N outputs and each output can be amplified and then go through nonlinear optical crystal to generate GHz sources through difference frequency generation. Such scalability in both directions does not exist and cannot be evolved from any existing technology without overcoming some fundamental limits.

Portability: The described Q-switch fiber laser weighs only about 400 grams. The majority of the weight comes from the laser housing, which can be modified to accommodate two fiber lasers and additional GHz generation parts. Portability can be readily achieved.

Spectral agility: Spectral agility of the GHz source can be realized by tuning one or both of the fiber lasers by stretching the fiber gratings thermally or piezoelectrically through attached piezo actuators as illustrated in the described Q-switched laser. Especially when piezo tuning is engaged, very fast tuning can be realized. Piezo actuators with resonance frequency >300 kHz are available on the market. In general practice, ⅓ of the resonance frequency can be used to drive the actuators, i.e. >100 kHz (or <10 µs) tuning speed can be achieved.

High energy efficiency: Nonlinear process efficiency relies highly on pump power density and spatial and temporal overlap of involved beams. Single mode fibers are ideal optical media to confine and deliver laser beams because of their small core sizes. For example, 30 W peak power of the fiber laser in 6-µm-diameter fiber results in >100 MW/cm² power density. The peak power can be increased to greater than 100 W by optimizing the laser cavity design, and further increased to 3 kW with a fiber amplifier to reach a power density of 5 GW/cm² or the physical break down power density of silica fibers. Spatially, two fiber lasers can be combined into one single-mode fiber to achieve perfect spatial overlap. Once fiber length is fixed, the light traveling time through the fiber can be predetermined so that the active Q-switch of the two fiber lasers can be precisely timed to realize the best possible temporal overlap. Alternately, a single PZT actuator can be used to stress both fibers to provide temporal overlap.

Easy to maintain: Fiber-based products share one distinctive feature that other technologies rarely possess: only minimum maintenance is required. Splices have replaced otherwise painstaking free-space alignments. Very reliable and robust GHz sources are made possible.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A Gigahertz (GHz) source, comprising:
   a GHz generator head including a nonlinear optic (NLO) material;
   a first Q-switched fiber laser configured to generate a first pulsed laser output at a frequency $\omega 1$;
   a second Q-switched fiber laser configured to generate a second pulsed laser output at a frequency $\omega 2$ that at least partially temporally overlaps said first pulsed laser output; and
   a beam combiner configured to combine the first and second laser outputs and routes the combined output to the GHz generator head where a nonlinear interaction process in the NLO material generates GHz radiation between 30 and 300 GHz that is output from the head, where each said first and second Q-switched fiber laser comprises a polarization-dependent resonant cavity including a fiber chain having a gain medium between narrowband and broadband fiber gratings, a pump source that couples energy into the fiber chain to pump the gain medium and a modulator that applies stress to the fiber chain to induce birefringence and switch the cavity Q-factor to alternately store energy in the gain medium and then release the energy of the laser output in a laser pulse.

2. The GHz source of claim 1, wherein the beam combiner is spliced between the first and second fiber lasers and the GHz generator head.

3. The GHz source of claim 1, wherein at least a portion of the fiber chain comprises a polarization-dependent fiber.

4. The GHz source of claim 1, wherein the narrowband fiber grating is formed in a polarization maintaining (PM) fiber creating a pair of reflection bands that correspond to different polarization modes, said broadband grating having a reflection band that is aligned to one of the narrowband grating's reflection bands.

5. The GHz source of claim 1, wherein the modulator is a piezoelectric transducer (PZT).

6. The GHz source of claim 1, wherein the first and second lasers emit single-transverse and single-longitudinal mode light.

7. The GHz source of claim 6, wherein the GHz radiation is single-transverse and single-longitudinal mode.

8. A Gigahertz (GHz) source, comprising:
a GHz generator head including a nonlinear optic (NLO) material;
a first Q-switched fiber laser configured to generate a sequence of first laser single-transverse, single-longitudinal mode pulses at a frequency $\omega 1$;
a second Q-switched fiber laser configured to generate a sequence of second single-transverse, single-longitudinal mode laser pulses at a frequency $\omega 2$, the Q-switching of said lasers being timed so that their laser pulses overlap temporally; and
a beam combiner configured to combine the first and second laser pulses and route the combined output to the GHz generator head where a nonlinear interaction process in the NLO material generates single-transverse, single-longitudinal mode GHz radiation between 30 and 300 GHz that is output from the head,
where each said first and second Q-switched fiber laser comprises a polarization-dependent resonant cavity including a fiber chain having a gain medium between narrowband and broadband fiber gratings, a pump source that couples energy into the fiber chain to pump the gain medium and a modulator that applies stress to the fiber chain to induce birefringence and switch the cavity Q-factor to alternately store energy in the gain medium and then release the energy of the laser output in a laser pulse.

* * * * *